United States Patent [19]

Nishimori et al.

[11] Patent Number: 4,707,263
[45] Date of Patent: Nov. 17, 1987

[54] WATER TREATMENT PACKAGE

[75] Inventors: Shozo Nishimori; Chikashi Eguma, both of Shiga, Japan

[73] Assignee: Shiraimatsu Shinyaku Kabushiki Kaisha, Shiga, Japan

[21] Appl. No.: 906,056

[22] Filed: Sep. 11, 1986

[30] Foreign Application Priority Data

Sep. 19, 1985 [JP] Japan .............................. 60-143771[U]

[51] Int. Cl.$^4$ ................................................ C02F 1/28
[52] U.S. Cl. .................................... 210/484; 210/282; 210/506
[58] Field of Search ................ 210/282, 484, 502.1, 210/503, 504, 506; 426/77

[56] References Cited

U.S. PATENT DOCUMENTS 2,749,307  6/1956  Ellison ................................ 210/282
3,436,345  4/1969  Goodenough et al. ............ 210/282
4,204,004  5/1980  Farr et al. ............................. 426/77
4,501,730  2/1985  Torii et al. ............................ 424/76

Primary Examiner—Ivars Cintins
Attorney, Agent, or Firm—Armstrong, Nikaido, Marmelstein & Kubovcik

[57] ABSTRACT

A water treatment package composed by filling the components to be packaged (2) into a water-permeable packaging means (1), characterized in that the aforementioned components to be packaged (2) comprise
  (i) bisque granules (A) on which the product separated from tea leaves (B) is adsorbed, or
  (ii) bisque granules (A) on which the product separated from tea leaves (B) is adsorbed and electrolytes (C).

As the water treatment package is plunged into water in a pot, the odors of disinfectant chlorine and mold will be completely removed, whereby water is made tasty.

11 Claims, 2 Drawing Figures

WATER TREATMENT PACKAGE

BACKGROUND OF THE INVENTION

INDUSTRIAL FIELD

The present invention relates to a disposable water treatment package not only for removal of odors of disinfectant chlorine, mold, etc., in drinking water but also for making water tasty as well.

PRIOR ART

Recently, distastefulness of city water stemming from deterioration of water quality of rivers and streams or lakes and swamps which are the sources of the water has become prominent. Particularly, many people point out the unpalatableness of water in summer. Likely causes for making city water nasty are believed to be the facts that increase of microoganisms due to eutrophication has produced mold odor and that the increased amount of chlorine (bleaching powder) has resulted in higher concentrations of residual chlorine in the city water.

For purifying drinking water, water purifiers of various types including pass-through type, cistern type, etc., are available on the market. As a representative of such water purifiers, an apparatus with active carbon which removes odors of disinfectant chlorine and mold, etc., from water to make it suitable for drinking by contacting is popular. Or a process of making water contact with granules of broken reef forming coral alone or in combination with active carbon to purify water and also for percolating mineral component are known. Besides, water purifiers using silver coated active carbon and those utilizing porous hollow fiber membranes have recently been employed.

PROBLEMS TO BE SOLVED BY THE INVENTION

Whether they are pass-through, cistern, stationary, table or portable, these conventional water purifiers are not only bulky, but also heavy and moreover, costly; besides, there is still something left to be done in improving the palatability of water, after impurities in water have been removed. In addition, microbial growth in stagnant water, when not in use, is feared.

In view of this situation, the present invention has been accomplished as a result of repetitive pursuit of assiduous studies to devise a disposable water treatment package which is convenient and capable of making water tasteful.

SUMMARY OF THE INVENTION

The water treatment package of this invention is composed of a water permeable packaging means (1) filled with components to be packaged (2), and is characterized in that the aforementioned components to be packaged (2) comprise
  (i) bisque granules (A) on which the product separated from tea leaves (B) obtained by dry-distillation of or extraction from tea leaves is adsorbed, or
  (ii) bisque granules (A) on which the product separated from tea leaves (B) obtained by dry-distillation of or extraction from tea leaves is adsorbed and electrolytes (C).

Thus the problems above described have been solved by devising such a specific water treatment package.

DETAILED DESCRIPTION OF THE INVENTION

Figure 1:
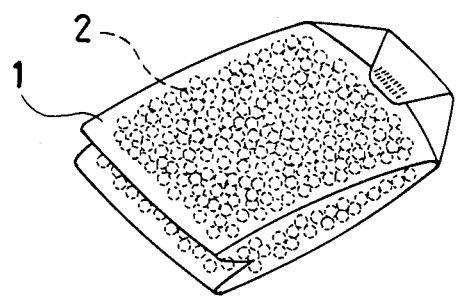
FIG. 1 is an oblique view illustrating a water treatment package of this invention.

As the water permeable packaging means (1), bags, nets, pipes, etc., made of porous materials may be mentioned and particularly, small bags made of non-woven cloths or papers are optimal.

In this water permeable packaging means (1), the components to be packaged (2) are filled. According to this invention, bisque granules (A) on which a specified adsorbate later-described is applied are used as the components to be packaged (2).

The bisque granules (A) may be obtained by granulating pottery stone, muscovite, kibushi-clay, etc., and thereafter, burning the glanules in oxidizing atmosphere at high temperatures, or after forming such a material in the shape of plate, etc., burning the plates and, then, crushing them. As for the burning temperature, around 800° C. which is the burning temperatures for manufacturing general unglazed pottery is proper, but products obtained by burning at still higher temperatures 850°–1150° C., particularly, 900°–1000° C., have higher impurity removing effect and are, therefore, more suitable for the purpose of this invention. This seems to be due to the fact that as the burning temperature is raised, the fine pores will become smaller, and that the surface state and fine pore diameters which are optimal for carrying the later-described product separated from tea leaves (B) and electrolytes (C) or for removal by adsorption of impurities in water will be obtained.

As for the shape of the bisque granules (A), spherical shape is desirable, because this shape is not liable to crushing during the manufacturing process or distribution or while in use of the package and moreover, it will give clean feel in appearance. The diameter of the spherical granule is often set on the order of 0.5–10 mm, particularly, on the order of 1–7 mm, but it may be set larger than that.

On the aforementioned bisque granules (A), the product separated from tea leaves (B) which is obtained by dry-distillation of or extraction from tea leaves is adsorbed.

As the product separated from tea leaves which is obtained as dry-distillation of tea leaves, dry distillate from tea leaves whose boiling point is 180°–200° C. at 20 mmHg is particularly desirable. Such a dry-disillate is obtained by heating raw leaves or dried leaves of tea charged in a dry-distilling apparatus under reduced pressure and collecting the distillate at 180°–200° C. under 20 mmHg. (The boiling point undergoes change with changing pressure reduction.) The distillation is normally performed using powders of tea leaves under reduced pressure, but depending on the circumstances, it is feasible to make extraction therefrom with water and/or organic solvent and, thereafter, dry-distillate the extract under reduced pressure.

And as the product separated from tea leaves which is obtained by extraction from tea leaves, extract from tea leaves with water and/or organic solvent is used.

In making comparison between the aforementioned dry-distillate of tea leaves and extract from tea leaves, the former is preferable in the odor removing effect and the effect for making water tasty. This seems to be resulted from the fact that by the dry-distillation, not only the inclusions are removed, but also the effective component are activated. On the other hand, the latter is advantageous in terms of cost.

The amount of the aforementioned product separated from the aforementioned tea leaves (B) to be adsorbed on the bisque granules (A) in proportion thereto shall be selected from a range on the order of 0.0001-2% by weight in the case of dry-distillate from tea leaves, and from a range on the order of 0.1-20% by weight in the case of extract from tea leaves, thus the amount required to be adsorbed being smaller in the former. If the amount of adsorption of the product separated from tea leaves (B) is too small, the effects of removing odor from water and making water tasteful will fall short; on the other hand, even if its amount is extremely increased, this will not enhance the effects beyond a certain limit, but also only entail disadvantageous cost-up.

Although the product separated from tea leaves (B), particularly, the extract from tea leaves, itself is sometimes colored or has some odor, after it is adsorbed on the bisque granules (A), its coloring component and odor are captured by the bisque granules (A) and will not exude into water.

It is proper to adsorb on the bisque granules (A) the aforementioned product separated from tea leaves (B) only, but it is particularly preferable to have some electrolytes (C) adsorbed thereon. Thus the result of removal of such impurity components as odors of disinfectant chlorine and mold by the bisque granules (A) and the product separated from tea leaves (B) will make the water tasty and in the additional presence of electrolytes (C), its mineral component will be supplemented; this will make water further tasty in coordination with the effect of the product separated from tea leaves (B) and moreover, make it possible to quickly supplement the water and electrolytes which have been lost by perspiration back to the human body.

The electrolytes (C) usable for this purpose include those containing sodium, potassium, calcium, magnesium, iron and manganese ions, etc., for example, sodium chloride, potassium chloride, magnesium chloride, potassium sulfate, calcium lactate, calcium bicarbonate, magnesium bicarbonate, sodium citrate, tripotassium phosphate, tricalcium phosphate, iron gluconates, iron chlorides, manganese sulfate, etc. It is also advantageous to use mineral water naturally produced or its concentrates or extracts from ores naturally produced which are dissolved out of them as electrolytes, using water or water to which citric acid is added.

The amount of adsorption of the electrolytes (C) on the bisque granules (A) in proportion thereto should be selected from a range on the order of 0.1-100% by weight, or preferably, 0.5-50% by weight; but its usable range is not limited to that when the bisque granules (A) on which the electrolytes (C) are adsorbed are plunged into water, the electrolytes (C) should go into solution as effective cations from several tens ppm to several hundreds ppm or more per 1 l of water.

The adosorption of the product separated from tea leaves (B) and the electrolytes (C) on the bisque granules (A) may be made by making contact with the bisque granules (A) water or alcohol solution of the product separated from tea leaves (B) and the electrolytes (C) by such a means as dipping or spraying or the like, followed by drying.

The water treating package of this invention may be obtained by filling the bisque granules (A) on which the aforementioned product separated from tea leaves (B) or this product plus the electrolytes (C) are adsorbed into a water permeable packaging means (1) such as of non-woven cloths, papers, etc.

It should be noted that while it is also feasible to use the electrolytes (C) in the state of powders or granulate them by appropriate method and fill their powders or granules into the water permeable packaging means (1), together with the bisque granules (A) on which the product separated from tea leaves (B) is adsorbes, without adsorbing the electrolytes (C) on the bisque granules (A). However, filling them into the water permeable packaging means (1) after adsorbing them on the bisque granules (A), together with the product separated from tea leaves (B), as above-described, is more preferable in their handling and in ensuring their activities and effects.

When the water treatment package obtained in this way is brought in contact with water in an appropriate container (pot, etc.), the water become tasty in several minutes by removing the odors of disinfectant chlorine and mold.

FIG. 1 is a perspective view illustrating a water treatment package of this invention, (1) representing water permeable packaging means, and (2) its components to be packaged.

FUNCTIONS AND EFFECTS

According to this invention, the activity of absorption-discharge (a kind of respiratory activity) of the bisque granules (A) is dexterously utilized. Thus the bisque granules (A) not only play the role of carrying thereon the product separated from tea leaves (B) and the electrolytes (C), but also they themselves make major contribution for removal by adsorption of impurities in water. And even if the product separated from tea leaves (B) is colored or stinks, they capture the color component and ordor, preventing them from exuding into water.

The product separated from tea leaves (B) removes the odor stemming from impurities in water and provides antimicrobial activity, thus having the effect of making water treatment complete in coordination with the impurities removing effect of the aforementioned bisque granules (A).

The electrolytes (C) go into solution in water, thereby play the role of not only supplementing water and the electrolytes which the body want to have, but also making their supply smooth.

And according to this invention, the components to be packaged (2) comprising the bisque granules (A), the product separated from tea leaves (B) or these plus the electolytes (C), which play the aforementioned roles, are wrapped by a water permeable packaging means (1); as this packaging is plunged into water in a pot, etc., and left for a while, the odors of disinfectant chlorine and mold will be readily and completely removed, whereby water is made tasty.

It should be noted further that a report by Noriko Yagi and Yoshinori Itokawa (J. Nutr. Sci. Vitaminol 25, 281-287(1979)) reported that if 0.5 ppm of residual chlorine exists in city water, vitamin B1 will be mostly decomposed in mere 10 min. when rice is cooked with such water. If the water treated by the water treatment package of this invention is used, the decomposition of vitamin B1 at the time of rice cooking may be effectively prevented.

Since this package is disposable, there is no fear of growth of microorganisms due to stagnation of water, when out of use, as in conventional water purifiers such as pass-through or cistern type, to the benefit of safety.

The water treated by the water treatment package of this invention may be used as water for drinking, as water for ice making, as water for green tea, powdered tea, black tea and coffee and as water for whisky-and-water or as cooking water for pottage, miso-soup, soup or for rice cooking, etc. It is useful for treatment of poor quality water, when necessitated during mountain climbing or traveling, etc.

It may be utilized as water for keeping goldfish, tropical fish, etc., or as water for cut flowers or for water cultivation. In such cases, it will prolong lives of fishes and plants and reduce frequency of water change.

Small in bulk, light in weight and low in cost, this apparatus is convenient for storing, handling and carrying.

The bisque granules (A), when formed spherical, are not liable to crushing during manufacturing, distribution or while in use of this package and give clean feeling in its appearance.

PREFERRED EMBODIMENTS OF THE INVENTION

The present invention will become more apparent from description taken in connection with a few embodiments thereof:

EXAMPLE 1

Granulating such a material as pottery stone, muscovite, kibushi-clay, etc., and then, burning the granules in an oxidizing atmosphere at 950° C., nearly white 2–3 mm spherical bisque granules (A) were manufactured. The composition of the bisque granules (A) were:

| | |
|---|---|
| $Al_2O_3$ | 20% |
| $SiO_2$ | 45% |
| $CaCO_3$ | 15% |
| $MgCO_3$ | 5% |
| Burnt loss | 15% |
| Physical constants were: | |
| Apparent specific gravity | 0.615 g/cc |
| Fine pore volume | 0.375 g/cc |
| Porosity | 30% |
| Water absorbency | 23.1% |

On the other hand, using a dry-distillation apparatus, dried powders of tea leaves were dry-distilled under the condition of the reduced pressure of 20 mmHg, a distillate with 180°–200° C. boiling points was collected as the product separated from tea leaves (B).

Further, as the electrolytes (C), calcium lactate, potassium chloride, manganese sulfate and iron gluconates were made available.

The product separated from tea leaves (B) and the electrolytes (C) were dissolved in water. An aqueous solution containing 0.5 g/l of dry-distillate, 20 g/l of calcium lactate, 4 g/l of potassium chloride, 0.03 g/l of manganese sulfate and 0.4 g/l of iron gluconates is prepared. The bisque granules (A) obtained as hereabove described were plunged into this aqueous solution and then pulled up and dried.

Then 3 g each of the components to be packaged (2) composed of the granules with adsorbates were filled in a water permeable packaging means (1) made of non-woven cloth, then, packaged, thereby manufacturing the water treatment package as shown in FIG. 1.

This water treatment packages was put in a pot filled with 3 l of city water and left standing for 5 min.

The amount of residual chlorine and odor of the water treated by this package, palatability of the treated water when served for drinking, and the life span of the cut flowers when arranged in a pot filled with the treated water, were examined respectively examined. The results are shown in Table 1.

Figure 2:
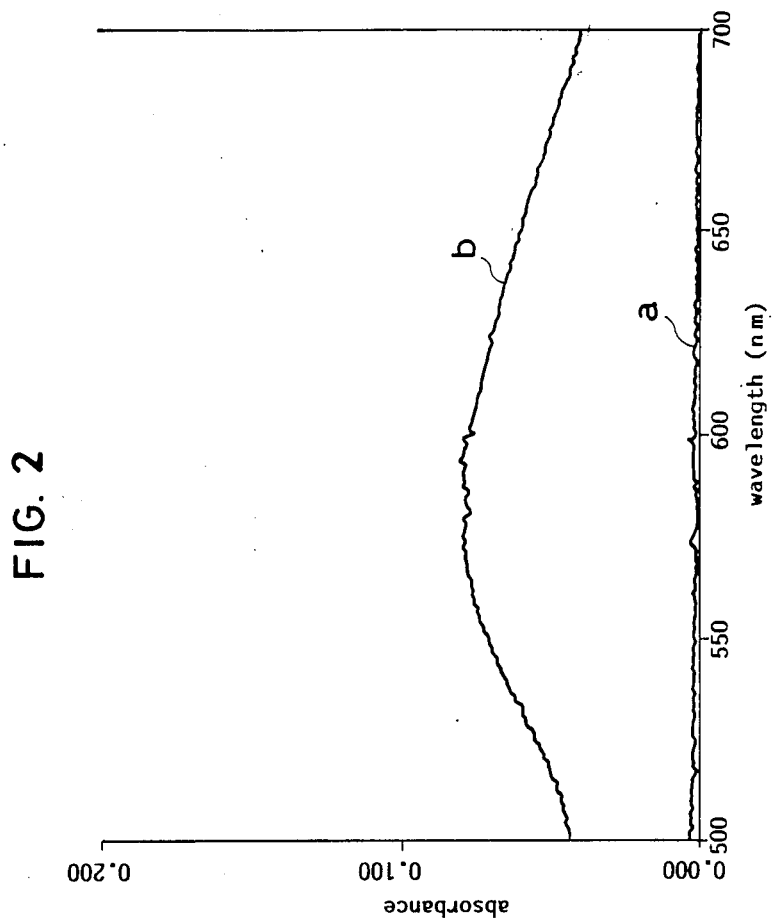
FIG. 2 shows the assay results of residual disinfectant chlorine taken before and after the treatment of city water in Example 1.

The assay results of the residues of disinfectant chlorine before treatment of city water (curve b) and after treatment of city water (curve a) are given in FIG. 2. In FIG. 2, the ordinate represents absorbance and the abscissa represents the wavelength of absorbed light.

Comparative Example 1

City water before treatment was tested similarly as in EXAMPLE 1.

The results are shown in Table 1.

Comparative Example 2

Five grams of active carbon was filled in a water-permeable packaging means (1) made of non-woven cloth, to be packaged thereby, and this package was tested similarly as in EXAMPLE 1.

The results are also shown in Table 1.

TABLE 1

| | Example 1 | Comparative Example 1 | Comparative Example 2 |
|---|---|---|---|
| Residual Chlorine (ppm) | 0.0 | 0.5 | 0.1 |
| Odor | Obliterated | Stinks | Very slight odor remaining |
| Tastiness | | | |
| Cold water | Excellent | Rather unacceptable | Rather good |
| Water for whisky-and-water | Excellent | Rather unacceptable | Rather good |
| Life span of cut flowers | More than half a month | 6 days | 6 days |

EXAMPLE 2

As the product separated from tea leaves (B), extracts from dried leaves of tea by hot water was used; bisque granules (A) were plunged into its 5% aqueous solution, then, pulled up and dried. By using them, a water treatment package was manufactured similarly as in EXAMPLE 1, except that the adsorption of electrolytes (C) was omitted.

With this water treatment package, the test was conducted in the similar manner as in EXAMPLE 1.

The results are shown in Table 2.

Comparative Example 3

On the city water before treatment, the test was conducted in the similar manner as in EXAMPLE 2.

The results are shown in Table 2.

Comparative Example 4

Five grams of active carbon was filled in water-permeable packaging means (1) made of non-woven cloth, to be packaged thereby, and this package was tested in the similar manner as in EXAMPLE 2.

The results are shown in Table 2.

TABLE 2

| | Example 2 | Comparative Example 3 | Comparative Example 4 |
|---|---|---|---|
| Residual Chlorine (ppm) | 0.0 | 0.5 | 0.1 |
| Odor | Obliterated | Stinks | Very slight odor remaining |
| Tastiness | | | |
| Cold water | Good | Rather unacceptable | Rather good |
| Water for whisky-and-water | Good | Rather unacceptable | Rather good |
| Life span of cut flowers | 2 weeks | 6 days | 10 days |

EXAMPLE 3

A water treatment package was manufactured and with this package, water treatment test was conducted in the similar manner as in EXAMPLE 1, except that natural mineral water, two fold concentrated water taken at Simobe Spa (Shimobe-cho, Nishi-Yatsushiro-gun, YAMANASHI JAPAN), was used as the electrolytes (C); this natural mineral water, with the product separated from tea leaves (B) added, was sprayed on the bisque granules (A) in the proportion of 40% by weight thereof, followed by drying at 60° C.

Similarly favorable results as in EXAMPLE 1 were obtained.

What is claimed is:

1. A water treatment package comprising, a water-permeable packaging means having packed therein; bisque granules which have been burned in an oxidizing atmosphere at a high temperature, on which a distillation or extraction product which is obtained and separated from tea leaves by dry-distillation or extraction is adsorbed.

2. A water treatment package according to claim 1 wherein said packed components comprise bisque granules on which the product which is obtained and separated from tea leaves and electrolytes are adsorbed.

3. A water treatment package according to claim 2 wherein said electrolytes are materials which produce in water sodium ions, potassium ions, calcium ions, magnesium ions, iron ions or manganese ions.

4. A water treatment package according to claim 2 wherein said water-permeable packaging means is a bag made of non-woven cloth or paper.

5. A water treatment package according to claim 2 wherein said bisque granules have a spherical shape.

6. A water treatment package according to claim 2 wherein said product separated from tea leaves is dry-distillate of tea leaves whose boiling point is 180°-200° C. at 20 mmHg.

7. A water treatment package according to claim 2 wherein said product separated from tea leaves is an extract from tea leaves taken by use of water and/or organic solvent.

8. A water treatment package according to claim 1 wherein said water-permeable packaging means is a bag made of non-woven cloth or paper.

9. A water treatment package according to claim 1 wherein said bisque granules have a spherical shape.

10. A water treatment package according to claim 1 wherein said product separated from tea leaves is dry-distillate of tea leaves whose boiling point is 180°-200° C. at 20 mmHg.

11. A water treatment package according to claim 1 wherein said product separated from tea leaves is an extract from tea leaves taken by use of water and/or organic solvent.

* * * * *